(12) United States Patent
Chu et al.

(10) Patent No.: US 8,130,199 B2
(45) Date of Patent: *Mar. 6, 2012

(54) COMPACT UNIVERSAL KEYBOARD

(75) Inventors: Frank Rui-Feng Chu, Fremont, CA (US); Noboru Kamijo, Kanagawa-Ken (JP); Denny Duan-Lee Tang, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 793 days.

This patent is subject to a terminal disclaimer.

(21) Appl. No.: 12/186,939

(22) Filed: Aug. 6, 2008

(65) Prior Publication Data
US 2008/0291172 A1    Nov. 27, 2008

Related U.S. Application Data (63) Continuation of application No. 09/768,829, filed on Jan. 25, 2001, now Pat. No. 7,439,957.

(51) Int. Cl.
*G06F 3/038* (2006.01)
*G09G 5/00* (2006.01)

(52) U.S. Cl. ............... 345/169; 379/433.07; 400/472; 400/479; 400/485; 345/55; 345/168

(58) Field of Classification Search .......... 345/55, 345/168, 169; 379/433.07; 400/472, 479, 400/485
See application file for complete search history.

(56) References Cited

U.S. PATENT DOCUMENTS

| | | |
|---|---|---|
| 3,633,724 A | 1/1972 | Samuel |
| 4,265,557 A | 5/1981 | Runge |
| 4,333,097 A | 6/1982 | Buric et al. |
| 4,481,508 A | 11/1984 | Kamei et al. |
| 4,655,621 A | 4/1987 | Holden |
| 4,911,565 A | 3/1990 | Ryan |
| 5,087,910 A | 2/1992 | Guyot-Sionnest |
| 5,128,672 A | 7/1992 | Kaehler |

(Continued)

FOREIGN PATENT DOCUMENTS
EP    0889388    7/1999
(Continued)

OTHER PUBLICATIONS

"Compact Computer Keyboard," IBM Technical Disclosure Bulletin, V27, N10A, Mar. 1985.

(Continued)

*Primary Examiner* — Alexander S Beck
*Assistant Examiner* — Tony N Ngo
(74) *Attorney, Agent, or Firm* — IP Authority, LLC; Ramraj Soundararajan (57) ABSTRACT

A keyboard type input device used in conjunction with a wristwatch or a portable telephone has multiple key positions provided as character entry keys. Each key corresponds to one key in the selected row of the conventional QWERTY keyboard. A second set of control buttons provide for the selection of which row of a conventional QWERTY keyboard are represented by the character keys in addition to other functions such as case shift, and alpha-numerical control functions. A selected row is shown on a display, as visual feedback. Alternatively the keys are implemented as LCDs with pressure sensors and the characters of the selected row are displayed directly on the corresponding key positions. The keyboard finds particular use in portable devices as it demands less space than traditional keyboards.

3 Claims, 6 Drawing Sheets

U.S. PATENT DOCUMENTS

| | | | |
|---|---|---|---|
| 339,299 A | 9/1993 | Kawashima | |
| 5,305,181 A * | 4/1994 | Schultz | 361/679.03 |
| 355,611 A | 2/1995 | Hanagata | |
| 5,408,287 A | 4/1995 | Winegarde et al. | |
| 5,432,510 A | 7/1995 | Matthews | |
| 5,450,078 A | 9/1995 | Silva et al. | |
| 5,493,654 A | 2/1996 | Gopher et al. | |
| 5,515,305 A | 5/1996 | Register et al. | |
| 5,552,782 A | 9/1996 | Horn | |
| 5,627,566 A | 5/1997 | Litschel | |
| 5,648,798 A | 7/1997 | Hamling | |
| 5,661,476 A | 8/1997 | Wang et al. | |
| 5,790,103 A | 8/1998 | Willner | |
| 5,812,117 A | 9/1998 | Moon | |
| 5,818,361 A | 10/1998 | Acevedo | |
| 5,825,353 A | 10/1998 | Will | |
| 5,828,323 A | 10/1998 | Bartet | |
| 5,841,374 A | 11/1998 | Abraham | |
| 5,841,849 A | 11/1998 | Macor | |
| 5,847,697 A | 12/1998 | Sugimoto | |
| 5,901,222 A | 5/1999 | Macor | |
| 5,917,476 A | 6/1999 | Czerniecki | |
| 5,949,348 A | 9/1999 | Kapp et al. | |
| 5,953,541 A | 9/1999 | King et al. | |
| 6,016,135 A | 1/2000 | Bliss et al. | |
| 6,072,471 A | 6/2000 | Lo | |
| 6,157,371 A | 12/2000 | Smeets | |
| 6,370,018 B1 | 4/2002 | Miller, Jr. et al. | |
| 6,386,773 B1 | 5/2002 | Mathias | |
| 6,392,640 B1 | 5/2002 | Will | |
| 6,489,950 B1 | 12/2002 | Griffin et al. | |
| 7,439,957 B2 * | 10/2008 | Chu et al. | 345/169 |
| 2001/0006587 A1 | 7/2001 | Keinonen et al. | |
| 2006/0061555 A1 * | 3/2006 | Mullen | 345/169 |

FOREIGN PATENT DOCUMENTS

| | | |
|---|---|---|
| JP | 52002120 | 1/1977 |
| JP | 05134797 | 6/1993 |
| JP | 06324805 | 11/1994 |
| JP | 07013658 | 1/1995 |
| JP | 05108244 | 4/1997 |
| JP | 2000132311 | 5/2000 |
| JP | 2000181614 | 6/2000 |
| JP | 2001265490 | 9/2001 |
| WO | WO9602394 | 2/1996 |
| WO | WO9712470 | 4/1997 |

OTHER PUBLICATIONS

"Keyboard for Handheld Computer," IBM Technical Disclosure Bulletin, V27, N10A, Mar. 1985.

* cited by examiner

COMPACT UNIVERSAL KEYBOARD

RELATED APPLICATIONS

This application is a continuation of U.S. application Ser. No. 09/768,829, filed Jan. 25, 2001, pending.

BACKGROUND OF THE INVENTION

1. Field of Invention

The present invention relates generally to the field of input devices. More specifically, the present invention relates to keyboard input devices designed to occupy a relatively small area so as to be particularly applicable to portable or hand-held electronic devices.

2. Discussion of Related Art

For many electronic devices which require keyboard inputs, a conventional keyboard is not practical. Most portable devices are designed to be small enough so as to be convenient for the user to carry them without undue burden. Pagers, cellular phones and palm top PCs are typically designed to fit into a shirt pocket while portable PCs are designed to be conveniently carried by the user in a small case or bag. These devices have limited surface space and accordingly their keyboards are designed with reduced sized keys, with fewer character keys, or the keys are arranged in a different manner than the traditional QWERTY style keyboard. Some devices are operated using a stylus interface. The user points the stylus at one character at a time on a graphic display of a keyboard in order to select the character.

While a number of solutions to the keyboard issues have been proposed, most of them are complicated for users familiar with the traditional QWERTY style keyboard. One solution requires the user to remember unique combinations of keys, as indicated in U.S. Pat. No. 5,493,654, "Chordic Keyboard System for Generating a Signal in Response to a Chord That is Assigned Using a Correlation Based on a Composite Chord-Difficulty Index" and U.S. Pat. No. 4,911,565, "Device for One-Handed Generation of Alpha-Numeric Characters". Other solutions provide for complicated micro keypads, as in U.S. Pat. No. 5,841,374, "Micro Word-Pad with Tactile Multifunctional Keys".

The QWERTY style keyboard developed due to the initial mechanics utilized in early typewriters. The layout of the symbols on early typewriters (i.e., QWERTY style) were placed in such a manner so as to slow the typist down. By slowing the typist down, mechanical problems were prevented. In recent years, however, the mechanical limitations imposed by the early typewriters have essentially disappeared. As such, there have been efforts to create layouts and keyboards which more effectively utilize the letter sequences most utilized in the English language so that the typists flow is not impeded. One such proposed solution is the so-called Dvorak keyboard.

Another keyboard which seeks to provide more efficient key layouts is described in U.S. Pat. No. 4,333,097, by Buric et al. An additional goal of this patent is to eliminate the need for the typist to move their fingers from the keys. Disclosed is a new keyboard structure interface which utilizes a set of eight input keys, one for each finger, and two scrolling keys, one for each thumb. The keyboard is utilized with a display, part of which displays the current input key assignments. The user uses an input key to enter the corresponding symbol assigned to that key. By actuating the scrolling buttons, the user can scroll, up or down, among a set of alternate symbol assignments for the input keys. The choice of symbol assignments (and therefore the ultimate "keyboard layout") is arranged in a manner which seeks to balance the relative frequency of symbols common in the English language with the relative strengths of the user's fingers.

The keyboard of Buric seeks to depart from the traditional QWERTY style keyboard, unlike one embodiment of the present invention. The provision of eight keys (one for each finger) and the two scrolling keys (one for each thumb) prevents the use of a QWERTY style layout, as there are ten keys per row on a QWERTY keyboard. Significant disadvantages result from the lack of support for a QWERTY style layout. Even though more efficient key layouts exist, the QWERTY keyboard is still the most popular layout for keyboards. A such, keyboard users are most familiar with the QWERTY keyboard and significant learning barriers are incurred when a user not only has to learn a new interface structure, but has to learn a new key layout in addition.

Similar to the keyboard of Buric, the keyboard of Kamei, et al., U.S. Pat. No. 4,481,508, provides ten physical keys for character entry and scrolling keys to change the symbols assigned to the keys for character entry, however, the patent to Kamei teaches scrolling through the characters in a sequential manner and does not provide for a QWERTY style layout. Therefore, the speed of touch typing is significantly reduced as users are not familiar with a sequential type key layout and must relearn not only the interface structure, but the sequential key layout in addition. In addition, the patents of Buric and Kamei et al. do not provide for key placements on the corresponding devices and other innovations of the present invention which effectively allow for an increase in display area.

Some products are known which address the need for keyboard input to portable or hand-held electronic devices. Think Outside™ produces a product known as the Stowaway™ Portable Keyboard. This is a full sized keyboard which folds down to a size with which it is capable to place in a person's pocket. The keyboard is designed so as to be unfolded and attached to the Palm™ PDA. Another product is an external keyboard which connects to a cellular phone made by NTT DoCoMo. Both of these suffer from the disadvantages of being larger than what would be desired for an input to a portable device and from the needed assembly to utilize the keyboards.

As described, the above products demonstrate the needs and difficulties of providing keyboard input to portable or hand-held electronic devices. Ideally, the keyboard input should be able to be affected in as natural a manner and as close to what users are accustomed to as possible. In addition, however, it is desirable for the keyboard to be as small as possible to allow for portability and to increase the allowable area to implement displays. However, the keys of the keyboard still need to be large enough for good ergonomic use.

Another, attempt at solving the above difficulties is demonstrated by U.S. Pat. No. 5,515,305 by Register et al. The PDA of Register has eight keys located on the back thereof. When the user grasps the PDA, each finger can contact a key. The input method of the keyboard of Register is a chordic style keyboard. While this allows a larger set of characters to be represented by fewer keys, allowing for the keys to be large enough for good ergonomic use and providing an overall smaller keyboard, chordic keyboards require a user to remember unique key combinations to input a character. To provide the same functionality as a standard keyboard such as those used with many present personal computers, a user must remember 101 different key combinations. In general, this is a significant amount of information for a user to remember in order to input characters to the electronic device and creates a significant learning barrier, especially as most users are used to actuating a single key to input a character. Hence, unlike the present invention, the chordic is a less natural means of inputting characters.

As the real estate war between display and keyboard on PDAs and other portable computing devices continues, keyboards will lose as displays increase in resolution, color, and attractiveness. Simply scaling down a full size keyboard creates keys which are too small for good ergonomic use. There is still a need for a user friendly keyboard type input which supports the traditional QWERTY style layout and which allows for a significant reduction in effective size. In addition, there is still a need for keyboards which provide a more natural input style for users of portable or hand-held electronic devices and which allow for faster input, while still providing possible reduction in overall keyboard size and in which the keys can be maintained at appropriate sizes for good ergonomic use.

SUMMARY OF THE INVENTION

The present invention provides for a wristwatch having an input/output device, wherein the wristwatch comprises: a display, the display displaying a selected set of input characters; a wrist band connected to the display for securing it to the wrist of a user; a flexible assembly operatively connected to the display; the flexible assembly having a set of character keys located thereon, each of the character keys associated with an individual character of the selected set of input characters and at least one control key, wherein the selected set of input characters comprises a single row of characters from a set of keyboard rows, and wherein actuation of any of the characters keys causes the character associated with the actuated key to be input into the device and actuation of the control key causes the currently selected set of input characters to be changed to a different set of input characters, and wherein the flexible assembly is pivotal from a position where the assembly extends substantially along and underneath the wristband to a position substantially perpendicular to the wristband.

The present invention provides for a portable phone including a housing having top and bottom surfaces and a plurality of side surfaces connecting the top and bottom surfaces and a reduced set character entry system, wherein the portable phone comprises: a first set of input keys located on any of the side surfaces, the set of input keys arranged in a single row, each of the input keys associated with an individual character of a first subset of a set of input characters, the set of input characters comprising a row from a set of keyboard rows, and actuation of any of the input keys causing the character associated with the actuated input key to be input to the portable phone; at least one selection key located on any of the side surfaces, and wherein actuation of the selection key changes the first subset to a second subset so that each of the input keys is associated with an individual character of the second subset, and wherein the input keys and the selection key are located on different ones of the side surfaces.

The present invention provides for a portable phone including a housing having top and bottom surfaces and a plurality of side surfaces connecting the top and bottom surfaces and a reduced set character entry system, wherein the portable phone comprises: a first set of input keys located on any of the side surfaces, the set of input keys arranged in a single row, each of the input keys associated with an individual character of a first subset of a set of input characters, the set of input characters comprising a row from a set of keyboard rows, and actuation of any of the input keys causing the character associated with the actuated input key to be input to the portable phone; at least one selection key located on any of the side surfaces, and wherein actuation of the selection key changes the first subset to a second subset so that each of the input keys is associated with an individual character of the second subset, and wherein the input keys and the selection key are located on different ones of the side surfaces and the side surface having the input keys located thereon is opposite to the side surface having the selection key located thereon.

BRIEF DESCRIPTION OF THE DRAWINGS

FIG. 1b illustrates a close up of the area on a portable computing device occupied by the key positions of the present invention as shown in FIG. 1a.

DESCRIPTION OF THE PREFERRED EMBODIMENTS

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

Figure 1A:
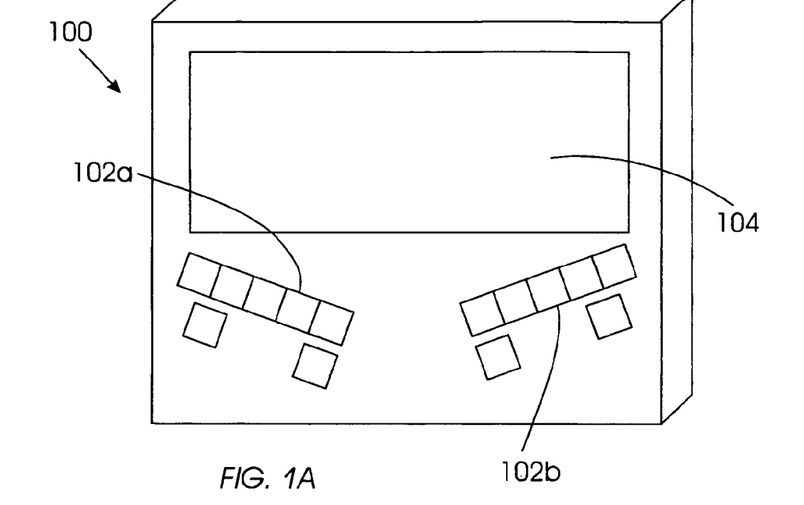
FIG. 1a illustrates a portable computing device on which a keyboard of the present invention is utilized.

FIG. 1a illustrates a portable computing device 100 on which the keyboard of the present invention is utilized. Generally, portable computing device 100 comprises a housing having a display 104 and, in this case, two distinct key input areas 102a, 102b. While shown as two distinct areas, it is within the scope of the present invention to combine the areas into one having key positions placed parallel to one another in a proximate fashion, much as the keys of a traditional keyboard. Distinct key areas 102a, 102b are utilized for input and display 104 is provided for feedback and general display purposes, as will be describe below.

Figure 1B:
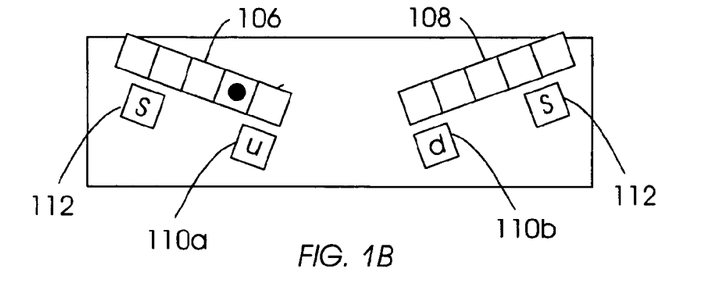

FIG. 1b provides a close up of the area on device 100 occupied by key positions 102a, 102b. As shown, a set of five character keys 106 are grouped together in a row, with each key contiguous to the key neighboring it. The keys are sized such that a they are at least as large as the spot size of a typical user's finger. In this manner, the chance a user strikes two keys at once is reduced. Character key positions 106 are generally provided so as to be actuated by the fingers located on the left hand of a user. Each of the character key positions 106 correspond to half of the symbols of a row of a traditional QWERTY keyboard. For instance, as a default, the character position keys 106 are set to correspond to the so-called "home row" of the keyboard and each key position would correspond to the symbols "a", "s", "d", "f", "g", (i.e., the five keys located on the left hand portion of the home row of a traditional QWERTY keyboard). Control keys 112, 110a provide for various control functions in relation to the keyboard and are provided below character keys 106, 108 for actuation by the user's thumbs. In particular, control key 110a provides an "up" function, which, when actuated, shifts the row corresponding to the key positions up by one row per actuation. Starting at the previously described default row, a single actuation of control key 110a causes the row to be switched from the home row to the row immediately above the home row. Character key positions would then correspond to "q", "w", "e", "r", "t", "y", which are the keys located on the left side of the row immediately above the home row. Control key 112 provides a "shift" function which toggles between capital letters and lower case letters.

A mirror image copy of character key positions 108 and control keys 110b, 112 are arranged in a mirrored fashion to key positions 106, 112, 110a. Character keys 108 provide for the right sided characters of the selected row. Control key 110b provides a "down function" which, when actuated, switches the selected row from the currently selected row to the row immediately below it. In the case of starting from our default position, control key 110b would switch the character keys from representing the home row to the one immediately below it so that the ten character keys (106 and 108 collectively) correspond to "a", "s", "d", "f", "g", "h", "j", "k", "l". By providing ten character keys, a traditional QWERTY keyboard can be emulated utilizing the present keyboard, i.e., in the case of the home row, keys g and h are provided for at the same time as the other home row keys.

Figure 1C:
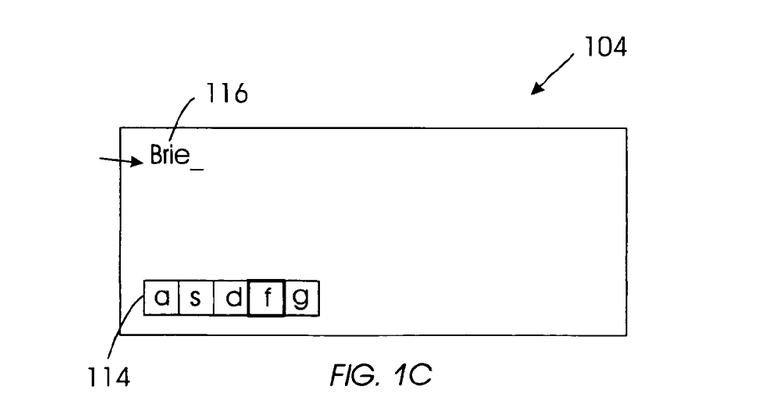
FIG. 1c illustrates a close up of the display of FIG. 1a providing input feedback capabilities.

FIG. 1c provides a close up of display 104 providing input feedback capabilities. Area 114 displays the current row selection which character key positions correspond to (while shown as only displaying half of the selected row, the full row can be shown as well, as will be describe below). Area 116 shows the previously typed characters and the current cursor position.

Figure 2A:
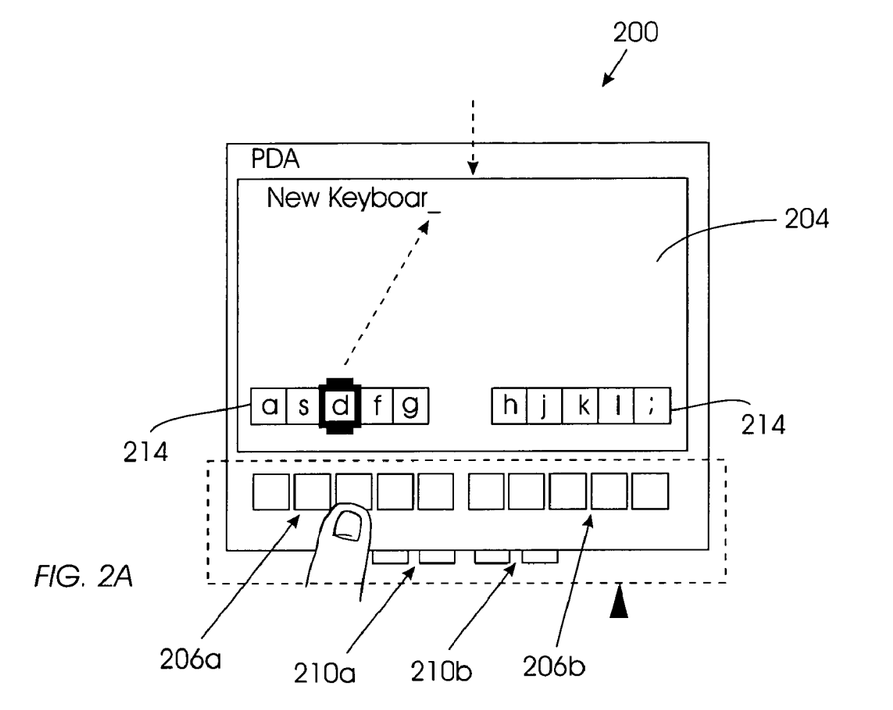
FIG. 2a illustrates a keyboard of the present invention implemented on a PDA with control keys located on a lower side section thereof.

FIG. 2a illustrates a further embodiment of the present keyboard implemented on a personal digital assistant (PDA) 200. In this embodiment, row selection feedback area 214 on screen 204 comprises indications of all of the input key characters in the selected row. Character key positions 206a, 206b are arranged in a proximate location to each other and are oriented such that they follow a single line, as the rows of a traditional keyboard do. A particularly advantageous implementation of the presently described embodiment places control keys 210a and 210b on the side of PDA 200. Placement of control keys 210a and 210b on the side of PDA 200 allows for more area on the surface of PDA 200 to be utilized for display.

Figure 2B:
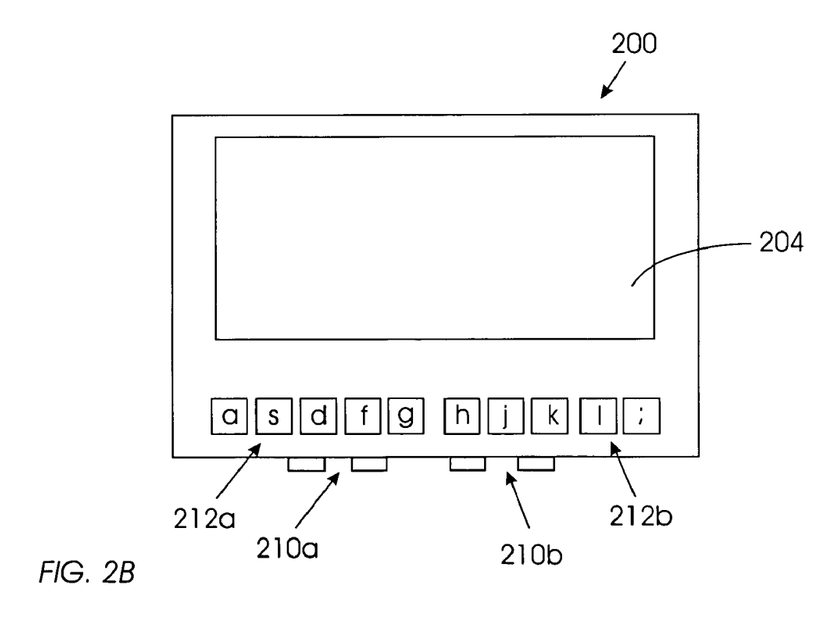
FIG. 2b illustrates a keyboard of the present invention implemented with LCD displays and pressure sensors such that characters associated with a key position are displayed on the corresponding display.

Another embodiment allowing for an increased display area is shown in FIG. 2b. In the embodiment of FIG. 2b, the physical input keys 212a and 212b have been replaced with LCD displays and pressure sensors. By providing LCD displays with pressure sensors for the input keys 212a and 212b, visual feedback for the selected row is displayed directly on keys 212a and 212b. When control keys 210a and 210b are actuated to select the current row of keys, the LCD displays of keys 212a and 212b change to display the characters of the currently selected row directly on the keys 212a, 212b. This allows for the area of display 204 previously utilized for displaying the selected row to be used exclusively for display of output information.

Figure 2C:
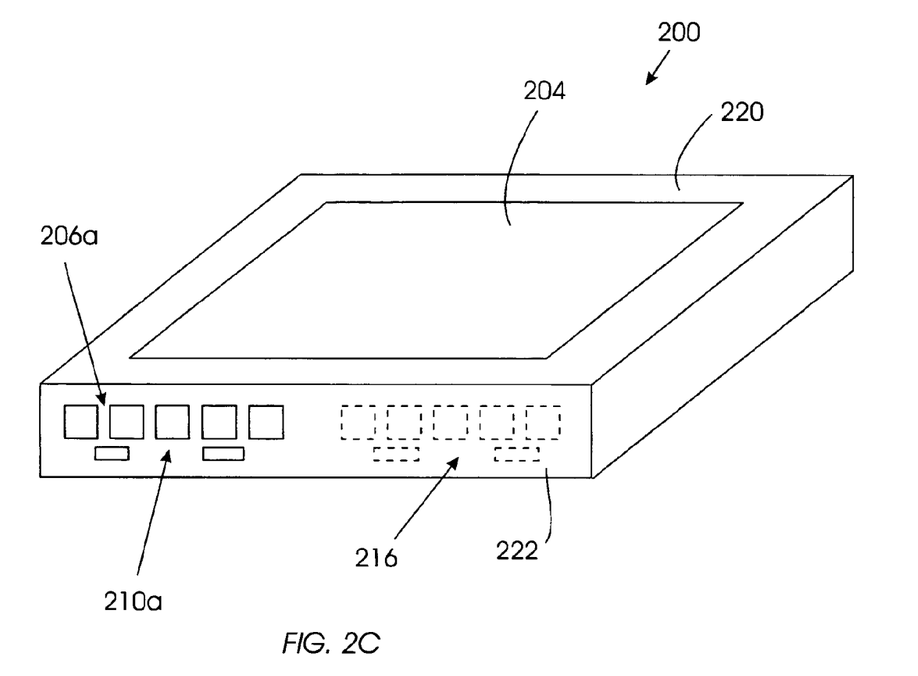
FIG. 2c illustrates a keyboard of the present invention on a side surface of a computing device.

An additionally advantageous implementation, as illustrated in FIG. 2c, places the entire keyboard on the side of PDA 200 allowing the entire top surface to be utilized for display. As shown, a computing device has a top surface 220 on which an LCD display 204 is placed, while the left hand side of character entry keys 206a and control keys 210a are placed on a side surface 222. The right hand set of keys are disposed on the surface (not shown) opposite to side surface 222. Alternatively, as indicated by the dotted areas 216, both the left and right sides of the keyboard are disposed along the same side surface. Other embodiments, in which the keys are broken into different sets other than left and right and in which keys are placed on different, non-opposing side surfaces, are also envisioned.

Figure 3A:
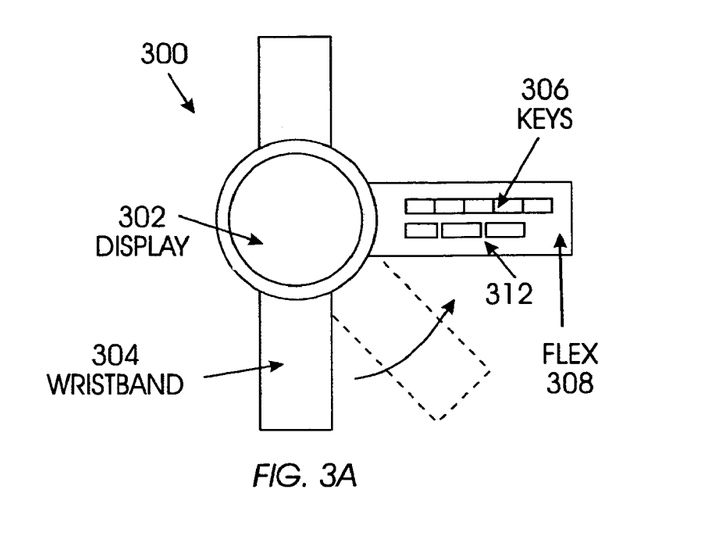
FIGS. 3a and 3b, collectively, illustrate a keyboard of the present invention utilized as an I/O device for a wrist watch.
Figure 3B:
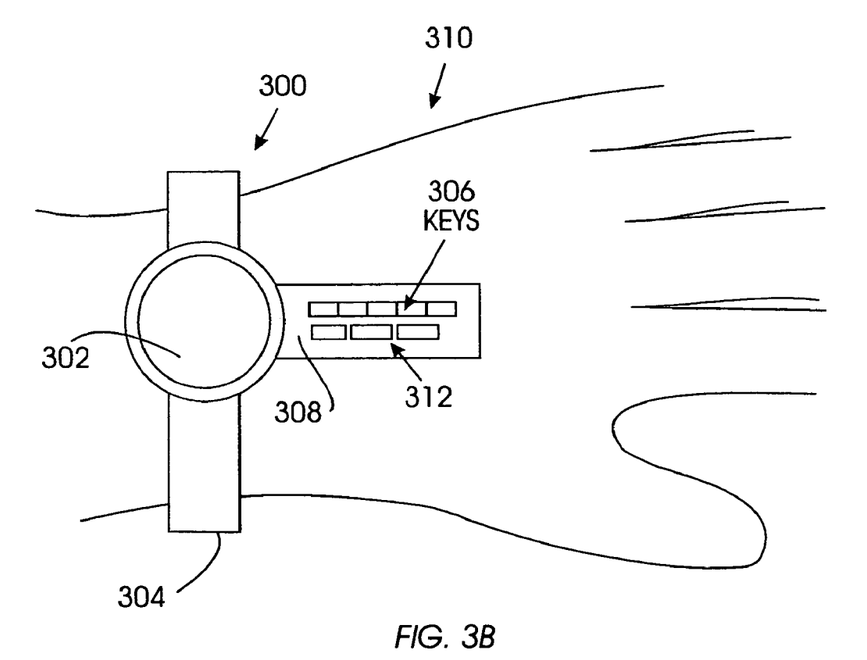

While described as implemented on a personal digital assistant, the present invention may also be advantageously utilized on small appliances, lab instruments, inventory control hand-held computers, tablet computers, e-mail only devices, etc. As shown in FIGS. 3a and 3b, the keyboard is utilized as an I/O device for a wrist watch electronic device. Watch 300 has display 302 and wristband 304. A flexible assembly 308 is provided with a row of character keys 306 and control keys 312 on the top surface thereof and is in a pivotal relationship to display 302 as illustrated in FIG. 3a. When not in use, flex assembly 308 is placed such that it extends along and underneath wristband 304. When the I/O device is to be used for input, flex assembly 308 is pivoted from underneath wristband 304 to a position substantially perpendicular to wristband 304, as illustrated in FIG. 3a. Flex assembly 308 is then laid across the back surface of a users hand 310 as shown in FIG. 3b and the opposite hand is utilized to actuate character keys 306 and control keys 312. Display 302 provides visual feedback of the selected row and typed input. When a single flex assembly is used, a conventional QWERTY layout is implemented and a button is used to switch between representations of the left and right side of the QERTY keyboard. Alternatively, different character switching schemes are utilized which differ from the traditional QWERTY layout for specific applications. For example, the character sequences can be optimized to prevent excessive movement through the character sets via use of the control key so as to help increase input speed. Alternatively, two flex assemblies are utilized, one rotating towards one side as previously described, while the other is rotated towards the opposite side. When the wristwatch is placed on a surface, input is accomplished using both hands. A particular advantage of utilizing two flex assemblies is the emulation of a QWERTY style keyboard.

Figure 4:
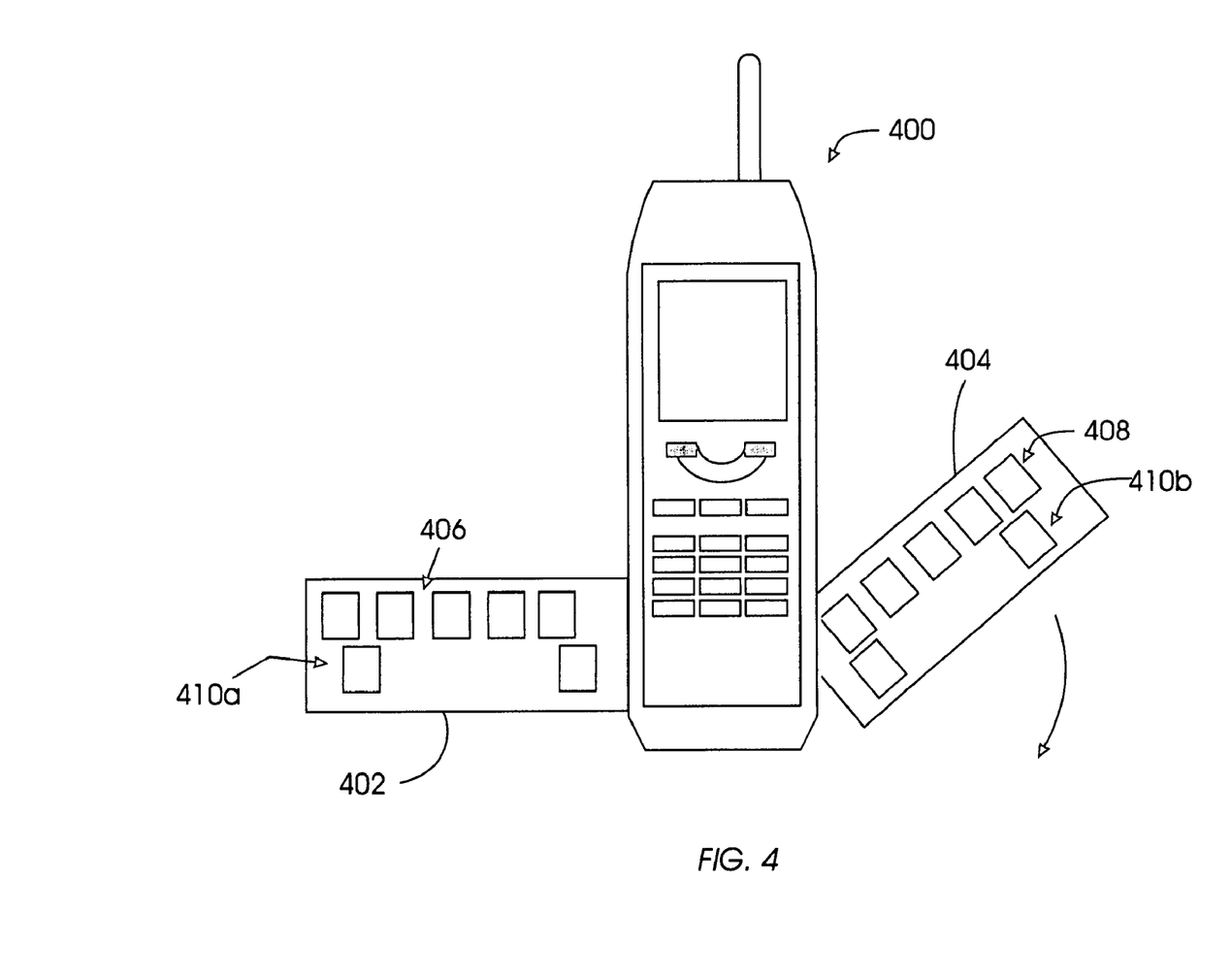
FIG. 4 illustrates the use of a keyboard with a portable phone, wherein the keys are implemented on extensible or attachable members.
Figure 5A:
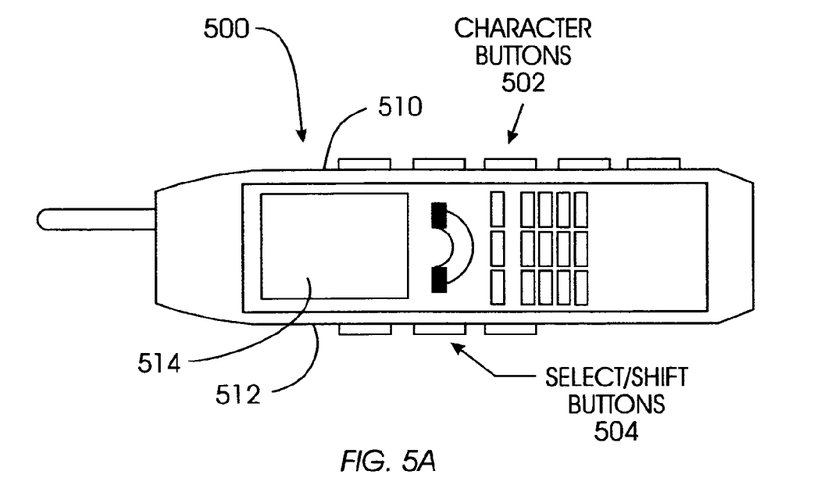
FIGS. 5a and 5b, collectively, illustrate the use of the present invention with a portable phone in which the keys are implemented on the sides of the portable phone.
Figure 5B:
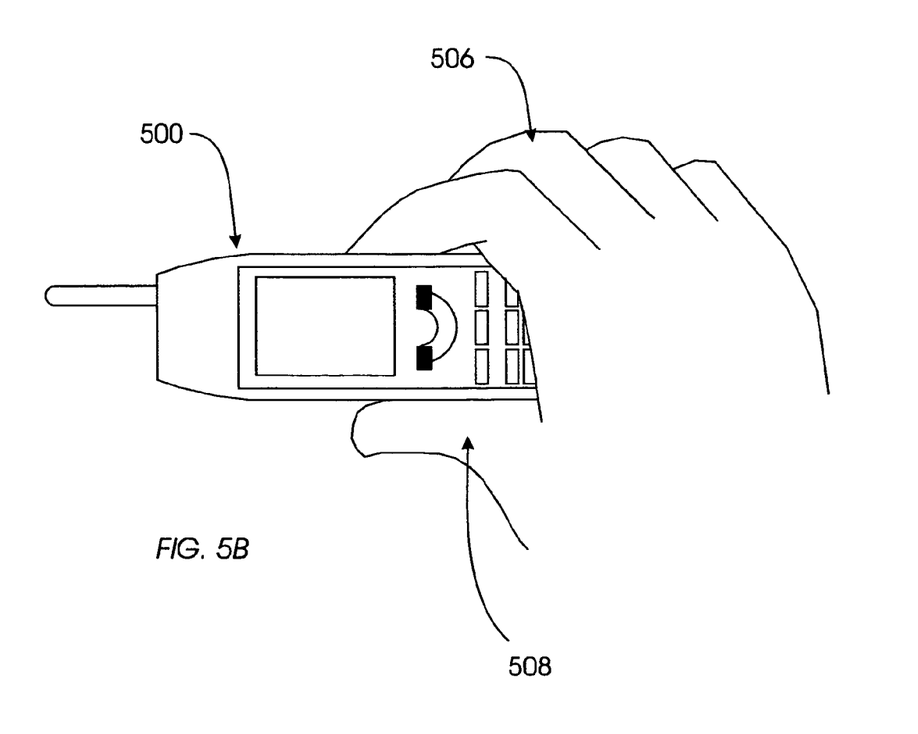

In addition, the principles of the present invention allow for an extension of the convenience and reduced size to be extended to other electronic appliances. FIGS. 4, 5a and 5b show this extension to a portable phone, such as a cellular phone. Cellular phone 400 has a pair of input members 402 and 404 attached thereto. Implemented on members 402 and 404 are character entry keys 406 and 408. Below character entry keys 406 and 404 are control keys 410a and 410b. A particular advantage of this embodiment is the keys can be made larger than the buttons already provided on phone 400, further facilitating entry. As illustrated by member 404, members 402 and 404 are integrated with the portable phone in a rotational fashion, and by rotating members 402 and 404 outward, the members extend perpendicularly to the length of phone 400. Placing phone 400 with members 402 and 404 rotated outward on a desk or other such surface, a user can affect entry in the same manner as previously described. In the closed position, the members are ideally enclosed within the housing of portable phone 400. It should be noted, that while members 402 and 404 have been described as rotating outward, other alternative methods of exposing members 402 and 404 would be appropriate. Alternatively, as illustrated by member 402, rather than housing members 402 and 404 located integral with phone 400 and extending them, they could be provided as separate devices externally attachable to phone 400. In this case, input members 402 and 404 would be attached to phone 400 via external connectors located on the side of phone 400. While two members have been illustrated, it is understood that a single member having the same number of character keys and control keys, or having half as many of either one or both is within the spirit of the present invention.

FIG. 5 illustrates an alternative embodiment utilizing the principles of the present invention in conjunction with a portable phone, such as a cellular phone. Character entry keys 502 are placed along one side 510 of phone 500. On the opposite side thereof 512, control keys 504 are placed. A user actuates character entry keys 502 using their fingers, while actuating control keys 504 with their thumbs to affect character input and to change characters associated with character keys 502, respectively. The third key illustrated is used to switch the character assignments of character keys 502 between the sides of a traditional QWERTY style keyboard. Input keys 502 and 504 are able to be larger than the keys typically provided with cellular phones, which helps to make complex inputs, such as lengthy text messages, easier. By rotating the display 514 by 90 degrees from its normal lengthwise orientation, proper feedback is provided to the user when utilizing the keys. While only three control keys have been illustrated, it would be advantageous to implement five keys on both sides of the phone. In this manner, switchable, left or right handed modes can be utilized, where the functions of the keys, i.e., character or control, switch sides depending upon the mode. This allows either a person whose dominate hand is the right hand or a person whose dominate hand is the left hand to utilize the input device comfortably.

FIG. 5b further illustrates the use of the embodiment described with connection to FIG. 5a. The user actuates keys 502 (not shown in FIG. 5b) with their fingers 506, while utilizing their thumb 508 to control the characters associated with keys 502 via control keys 504 (not shown in FIG. 5b).

While particularly suited so as to be capable of providing a QWERTY style layout, the keyboard can be extended to all possible keyboard applications. Due to the fact that the character keys are "soft" keys, i.e., the corresponding characters to the key positions are mutable, each key can be mapped to any desired alphabet, numeral, oriental characters, e.g. kana, or any arbitrary symbol. Also, phrases, such as the most commonly utilized phrases for pagers or telephone customer service banks can be mapped to the character key positions.

CONCLUSION

A system and method has been shown in the above embodiments for the effective implementation of a universal compact keyboard. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, additional control functions are capable by providing more control keys along the control row. In addition, the displays have been described as LCD screens, however, any appropriate technology for providing visual displays for a user may be utilized. The universal compact keyboard can be implemented in any environment where it is advantageous to provide full keyboard support in a limited area, such as PDAs, cellular phones, pagers, sub-notebook, etc.

The invention claimed is:

1. A wristwatch having an input/output device, said wristwatch comprising:
    a display, said display displaying a selected set of input characters;
    a wrist band connected to said display for securing said display to the wrist of a user;
    a flexible assembly operatively connected to said display;
    said flexible assembly having a set of character keys located thereon, each of said character keys associated with an individual character of said selected set of input characters and at least one control key, wherein said selected set of input characters comprises a single row of characters from a set of keyboard rows, and
    wherein actuation of any of said characters keys causes the character associated with said actuated key to be input into said device and actuation of said control key causes said currently selected set of input characters to be changed to a different set of input characters, and
    wherein said flexible assembly is pivotal from a position where said assembly extends substantially along and underneath said wristband to a position substantially perpendicular to said wristband.

2. A portable phone including a housing having top and bottom surfaces and a plurality of side surfaces connecting said top and bottom surfaces and a reduced set character entry system, said portable phone comprising:
    a first set of input keys located on any of said side surfaces, said set of input keys arranged in a single row, each of said input keys associated with an individual character of a first subset of a set of input characters, said set of input characters comprising a row from a set of keyboard rows, and actuation of any of said input keys causing the character associated with said actuated input key to be input to said portable phone;
    at least one selection key located on any of said side surfaces, and
    wherein actuation of said selection key changes said first subset to a second subset so that each of said input keys is associated with an individual character of said second subset, and wherein said input keys and said selection key are located on different ones of said side surfaces.

3. A portable phone including a housing having top and bottom surfaces and a plurality of side surfaces connecting said top and bottom surfaces and a reduced set character entry system, said portable phone comprising:
    a first set of input keys located on any of said side surfaces, said set of input keys arranged in a single row, each of said input keys associated with an individual character of a first subset of a set of input characters, said set of input characters comprising a row from a set of keyboard rows, and actuation of any of said input keys causing the character associated with said actuated input key to be input to said portable phone;
    at least one selection key located on any of said side surfaces, and
    wherein actuation of said selection key changes said first subset to a second subset so that each of said input keys is associated with an individual character of said second subset, and wherein said input keys and said selection key are located on different ones of said side surfaces and said side surface having said input keys located thereon is opposite to said side surface having said selection key located thereon.

* * * * *